Nov. 25, 1958   F. R. SIMON ET AL   2,861,664
MAGNETICALLY CONTROLLED DEVICE OF MULTIPLE DISC TYPE
Filed Aug. 2, 1954

INVENTORS
FRANK R. SIMON
RICHARD O. PALMER
BY
ATTORNEY

United States Patent Office 2,861,664
Patented Nov. 25, 1958

2,861,664

MAGNETICALLY CONTROLLED DEVICE OF MULTIPLE DISC TYPE

Frank R. Simon, Manchester, Conn., and Richard O. Palmer, Shrewsbury, Mass., assignors to The Carlyle-Johnson Machine Company, Manchester, Conn., a corporation of Ohio Application August 2, 1954, Serial No. 447,145

5 Claims. (Cl. 192—84)

The invention relates to a magnetically controlled multiple disc clutch, and the general object of the invention is to provide such a clutch which is constructed to constitute a self-contained unit wherein all of the parts are carried by a tubular connector engageable with a shaft and which includes a nonrotatable annular magnet coil and a rotatable magnet armature serving upon energization of the coil to apply the required pressure to the clutch discs.

Another object of the invention is to provide a multiple disc clutch wherein there is a disc unit which is readily removable and replaceable.

Other objects of the invention will be apparent from the drawing and the following description.

In the drawing we have shown in detail one embodiment of the invention, but it will be understood that various changes may be made from the construction shown, and that the drawing is not to be construed as defining or limiting the scope of the invention, the claims forming a part of this specification being relied upon for that purpose.

Figure 1:
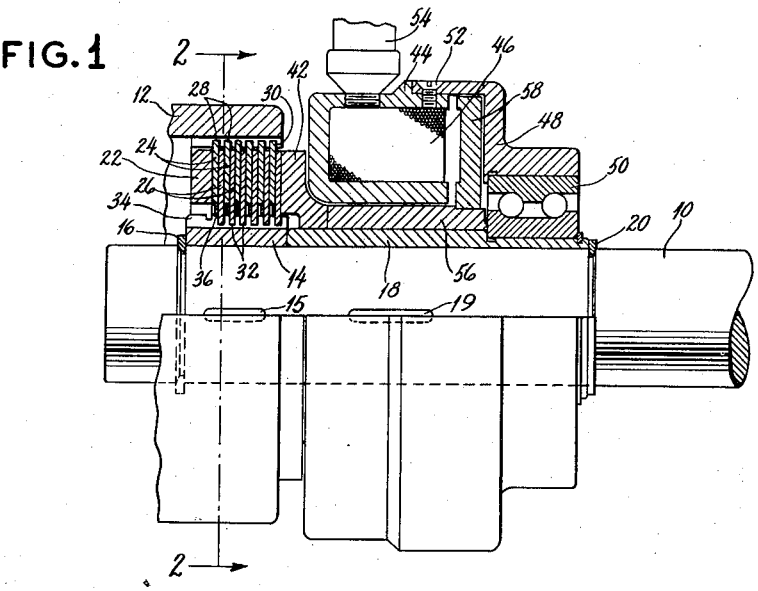
Fig. 1 is a combined longitudinal central sectional view and side view of a device embodying the invention.
Figure 2:
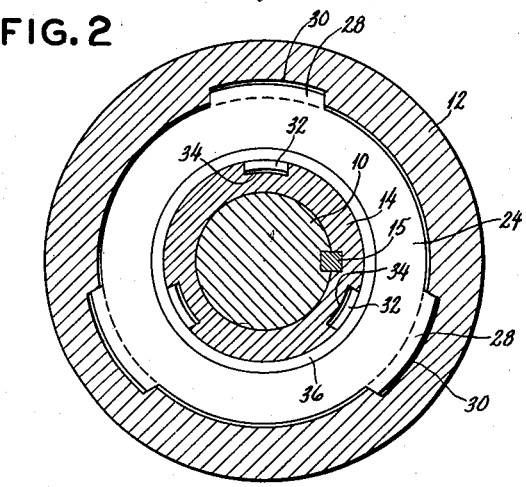
Fig. 2 is a transverse sectional view taken along the line 2—2 of Fig. 1.

The device shown will be referred to as a clutch and it is adapted for transmitting power between two rotary members having aligned axes. It is also adapted to serve as a brake when used with one rotary member and a cooperating stationary member.

Assuming that power is to be transmitted, one member is a shaft 10 and the other member is an annular member 12 which is connected to or formed as a part of any suitable power transmitting means. Power may be transmitted from either member to the other, but for convenience of description it will be assumed that the shaft 10 is the driving member and the annular member 12 is the driven member. The shaft 10 and the annular member 12 are supported by suitable bearings which are not shown. At least one of the bearings for each member serves to prevent endwise movement. In the description which follows the terms "left" and "right" will be used for convenience and clarity, but it will be understood that these terms do not limit the invention. The clutch as illustrated can be reversed in position without departing from the invention.

A connector member or sleeve 14 is preferably provided which is adapted to surround the shaft 10 and to be connected thereto by means such as a key 15, the said member or sleeve being within the annular member 12. Suitable means such as a split ring 16 prevents the member 14 from moving toward the left. A second connector member or sleeve 18 is provided which is preferably structurally separate from the connector member or sleeve 14 and which is also adapted to surround the shaft 10 and to be connected thereto by means such as a key 19. The said member 18 preferably abuts against the member 14. Suitable means such as a split ring 20 prevents the connector member or sleeve 18 from moving toward the right. The said connector members 14 and 18 are sometimes hereinafter referred to collectively as a "tubular connector" and are sometimes referred to separately as "first" and "second" connector members. The two members 14 and 18 which constitute the tubular connector extend from end to end of the clutch and they serve to carry or support all other parts of said clutch. The two snap rings 16 and 20 thus serve as means which hold the end portions of the tubular connector in fixed longitudinal relationship.

Means is provided for transmitting power from the driving shaft 10 to the driven member 12, this means including the beforementioned first connector member or sleeve 14 adapted to be connected to the shaft 10. The said means includes not only the said member 14 but also an abutment means connected therewith and held against longitudinal or rotative movement relatively thereto. This means is shown as being a locking or abutment ring 22 suitably connected to the said member 14. The ring 22 may advantageously be connected with the member 14 in the manner disclosed in Patent 2,166,130 issued July 18, 1939 in the name of Allan R. Coe.

The power transmitting means also includes a series of interengaging friction discs 24, 24 and 26, 26 which surround the first connector member 14 and which are within the annular member 12. Alternate discs 24, 24 have outwardly projecting lugs 28, 28 which are adapted to enter longitudinal grooves 30, 30 in the annular member 12. The intervening discs 26, 26 have inwardly projecting lugs 32, 32 which enter longitudinal grooves 34, 34 in the first connector member 14. The several discs are frictionally engageable with each other and, when pressure is applied to force the discs toward the left and into firm engagement with each other, the said discs serve in the conventional manner to transmit power between the first connector member 14 and the annular member 12. More specifically, power is transmitted from the shaft 10 and the connector member 14 to the annular member 12.

Figure 3:
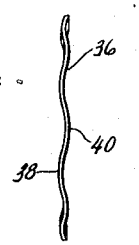
Fig. 3 is a side view of a separator washer.
Figure 4:
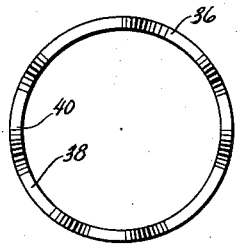
Fig. 4 is a face view of the washer shown in Fig. 3.

It is important that the discs be slightly separated when pressure is released and when no power is to be transmitted. For this purpose there are provided separator rings 36 such as disclosed in Patent 2,217,357 issued October 8, 1940 to Allan R. Coe. One of the rings 36 is shown in detail in Figs. 3 and 4. The said rings are located respectively within the discs 24, 24 and between the discs 26, 26. These rings are of wave-like form having alternate humps and depressions 38 and 40, respectively, on opposite sides, the depressions on one side of each ring being formed by the humps on the opposite side, as shown in Fig. 3 of the drawing. The full thickness of these rings from the plane of the humps on one side to the plane of the humps on the opposite side is sufficient to slightly more than fill the spaces between the planes of the sides of the discs 24, 24, so that each ring exerts pressure upon the two discs 26, 26 between which it is located. The result of this construction is that, when the discs are pressed together for power transmitting action, the separating rings 36, 36 are all compressed between the discs and when the pressure on the discs is released the rings 36, 36 act to separate the discs so that there will be no dragging action of one disc upon another, and the clutch therefore promptly terminates its power transmitting action.

A suitable means is provided for applying pressure to the friction discs, and when the second connector member 18 is structurally separate from the first connector member 14 the said means is carried by or connected with the member 18 entirely independently of the member 14. As shown the said means includes a pressure ring 42 which surrounds and is concentric with the shaft 10 and which preferably surrounds and fits the member 18. The ring 42 is longitudinally movable to a slight extent relatively to the shaft and the member 18 but there is no tendency for the ring to rotate relatively to the shaft or the member. The friction disc that is directly engaged by the ring is one of the discs 26, 26 which are connected to rotate with the member 14. The members 14 and 18 rotate in unison and therefore the ring 42 rotates in unison with the member 18.

An electromagnetic means is provided for controlling the application of pressure to the friction discs. This means includes a nonrotating annular magnet and a longitudinally movable armature which is rotatable with the connector member 18 and with the pressure ring 42.

As shown, there is a nonrotary annular magnet housing 44 which is concentric with the connector member 18 and the shaft. The housing 44 is formed from magnetic metal and is shaped to provide an annular chamber open at the right. An annular magnet coil 46 is entered in and fits the annular chamber in the housing. The housing 44 is rigidly connected with a nonrotary annular support 48 which partly surrounds the said housing and which is concentric with the shaft 10 and the connector member 18. An antifriction bearing such as a ball bearing 50 is interposed between the said annular support 48 and the said connector member 18. Said bearing has its inner race fixedly connected with the member 18 of said tubular connector near the right end thereof and has its outer race in fixed relation to said inner race except as to relative rotative movement. The members 44 and 48 may be connected by screws 52. The ball bearing 50 maintains the members 44 and 48 in concentric relationship with the tubular connector and the shaft while permitting free rotation of said connector and saft. The ball bearing further serves to prevent endwise or longitudinal movement of the support 48 and of the housing 44. The member 48 is formed of nonmagnetic metal. A pipe or conduit 54 is connected with the housing 44. This serves to prevent rotation of the housing 44 and of the member 48 and also serves to enclose electrical connections for the magnet coil 46.

Surrounding the shaft 10 and the connector member 18 and surrounded by the annular magnet housing 44 is a sleeve 56 which is longitudinally movable within narrow limits. Said sleeve 56 preferably fits and is guided by the said connector member 18. The sleeve 56 is rotatable in unison with the connector member although not necessarily positively connected for such rotation. The sleeve 56 is formed of nonmagnetic metal. The said sleeve has engagement at its left end against the pressure ring 42 and the movement of the sleeve toward the right is limited by the inner race of the bearing 50. An armature ring 58 formed of magnetic metal surrounds the sleeve 56 and is rigidly connected therewith by suitable means such as brazing. The ring 58 is rotatable with the sleeve 56 and is within the annular member 48 and is adjacent the end of the housing 44 and adjacent the end of the coil 46. Clearance is provided around the ring 58 so that it is freely rotatable. It will be observed that the magnet is between the pressure ring 42 and the armature ring 58. The pressure ring 42 and the sleeve 56 are preferably structurally separate parts, but they ordinarily move in unison and they are sometimes referred to collectively as "pressure means" for applying pressure to the discs.

It will be observed that the magnet is spaced from said sleeve 56 and from said pressure ring 42 and in fact from all parts of the clutch other than the magnet support 48. It is therefore evident that said support 48 constitutes the sole means for maintaining said magnet in concentric relationship with the other parts of the clutch.

It may be assumed that Fig. 1 shows the parts in their nonoperative positions, that is, with the magnet coil de-energized and with the discs 24, 24 and 26, 26 separated. The amounts of separation of the discs are too small to be shown in the drawing but it is assumed that they have been slightly separated by the separator rings 36, 36. As the result of the action of the said rings the pressure ring 42 and the sleeve 56 and the armature ring 58 have all been moved toward the right. The last said parts have no contact or engagement with any stationary or nonrotary parts and they therefore rotate with the shaft 10 and the member 18.

A switch, not shown, is provided for controlling the flow of current to the magnet coil 46 and when the switch is closed the coil is energized and the armature ring 58 is moved toward the left. The sleeve 56 and the pressure ring 42, which constitute the pressure means, act to apply pressure to the friction discs and to press them toward the abutment ring 22. The friction discs are so pressed in opposition to the action of the separator rings 36, 36. When the magnet is de-energized the rings 36, 36 constitute spring means which act to separate the friction discs and to move the pressure ring 42 and the sleeve 56 and the armature ring 58 toward the right. Thus the armature ring and the pressure means are moved in opposite directions by the magnet and the spring means, pressure being applied to the discs upon movement in one of the said directions and pressure being released upon movement in the other of the said directions.

In describing operation, it has been assumed that power is to be transmitted and that the shaft 10 is the driving member and is continually rotating. When the member 12 is the driving member, the action is the same as described except that the parts such as the pressure ring 42 and the sleeve 56 and the armature ring 58 do not rotate continually but only when the shaft and the said parts are rotated by the member 12 through the action of the friction discs.

When the device is to be used as a brake, either the member 10 or the member 12 may be stationary and the other member is rotary. When the friction discs are engaged as before described, rotation of the rotary member is stopped.

When the connector member 14 is structurally separate from the connector member 18, as is shown and as is preferred, the said connector member 14 and the abutment ring 22 and the friction discs 24, 24 and 26, 26 and the separator rings 36, 36 constitute a removable and replaceable disc unit. When the unit is in place, pressure is applied to or released from the discs by means such as the magnet and the parts associated therewith which means is supported entirely independently of the connector member and which is preferably supported at least in part by the connector member 18.

The friction discs are subject to some wear and replacement is eventually required. Heretofore the removal and replacement of the discs of a multiple disc clutch has been troublesome particularly as considerable time is required with resultant loss of operation or production by the machine driven by the clutch. In accordance with the present invention, the disc unit as above defined can be removed and replaced by a new or reconstructed unit with only a very small loss of operating time. With the member 12 out of the way, the unit can be readily removed endwise from the shaft 10 after first removing the split ring 22.

When a unit has once been removed, it can be overhauled when convenient, all necessary repairs and replacements therefor being made without interrupting production.

The invention claimed is:

1. In a clutch of the multiple disc type, the combination of a tubular connector extending through the clutch from the left end thereof to the right end thereof and adapted to surround and to be detachably connected with a power transmitting shaft for rotation therewith which tubular connector has its left and right end portions held in fixed longitudinal relationship, abutment means secured to the tubular connector near the left end thereof, a series of interengaging friction discs surrounding the tubular connector and having the disc at the left end of the series in engagement with said abutment means, alternate discs of the series being connected to said tubular connector for rotation therewith and the intervening discs being connectible with an annular power transmitting member, a rotatable and longitudinally movable pressure means surrounding the tubular connector and having its left end adjacent said discs which pressure means serves upon longitudinal movement thereof toward the left to apply pressure to said discs, a rotatable armature ring rigidly connected with said pressure means at a position remote from the discs and adjacent the right end of said pressure means, a nonrotatable annular magnet surrounding said rotatable and longitudinally movable pressure means and located at least in part between said discs and said rotatable armature ring, and means connected with said magnet and engaging said tubular connector at a position at the right of said rotatable armature ring which last said means serves to prevent longitudinal movement of said magnet and to thus enable said magnet when energized to move the armature ring and the pressure means relatively to the tubular connector and toward the left so as to apply pressure to said discs.

2. In a clutch of the multiple disc type, the combination of a tubular connector extending through the clutch from the left end thereof to the right end thereof and adapted to surround and to be detachably connected with a power transmitting shaft for rotation therewith which tubular connector has its left and right end portions held in fixed longitudinal relationship, abutment means secured to said tubular connector near the left end thereof, an anti-friction bearing having its inner race fixedly connected with said tubular connector near the right end thereof and having its outer race in fixed relation to said inner race except as to relative rotative movement, a series of interengaging friction discs surrounding the tubular connector and having the disc at the left end of the series in engagement with said abutment means, alternate discs of the series being connected to said tubular connector for rotation therewith and the intervening discs being connectible with an annular power transmitting member, a rotatable and longitudinally movable pressure means surrounding the tubular connector and having its left end adjacent the discs and with its right end adjacent the bearing which pressure means serves upon longitudinal movement thereof toward the left to apply pressure to said discs, a rotatable armature ring rigidly connected with said pressure means at a position near the right of said pressure means and adjacent the bearing, a nonrotatable magnet support held in fixed relationship with said outer race of said bearing and spaced from said pressure means and from said armature ring, and a nonrotatable annular magnet surrounding said pressure means and located at least in part between said discs and said rotatable armature ring and serving when energized to move the armature ring and the pressure means relatively to the tubular connector and toward the left so as to apply pressure to said discs, said magnet being rigidly connected with said nonrotatable magnet support and being spaced from all other parts of the clutch and from said annular power transmitting member so that said magnet support constitutes the sole means for maintaining said magnet in concentric relationship with the other parts of the clutch.

3. In a clutch of the multiple disc type, the combination of a tubular connector extending through the clutch from the left end thereof to the right end thereof and adapted to surround and be detachably connected with a power transmitting shaft for rotation therewith which tubular connector has its left and right end portions held in fixed longitudinal relationship, abutment means secured to said tubular connector near the left end thereof, a series of interengaging friction discs surrounding the tubular connector with the disc at the left end of the series engaging the said abutment means, alternate discs of the series connected to the connector for rotation therewith and the intervening discs of the series being connectible with an annular power transmitting member surrounding the said connector, a pressure ring surrounding the tubular connector and rotatable therewith and engageable with the disc at the right end of the said series, a longitudinally movable sleeve structurally separate from said pressure ring and surrounding the tubular connector and rotatable therewith, the said sleeve engaging at its left end with said pressure ring and causing the ring to apply pressure to the discs upon movement of the sleeve toward the left, a rotatable armature ring rigidly connected with the longitudinally movable sleeve at a position near the right end thereof and longitudinally spaced toward the right from the pressure ring, a nonrotatable annular magnet surrounding the longitudinally movable sleeve between the rotatable pressure ring and the rotatable armature ring, and means connected with said magnet and engaging said tubular connector at a position at the right of said rotatable armature ring which last said means serves to prevent longitudinal movement of said magnet and to thus enable said magnet when energized to move the armature ring and also the sleeve and the pressure ring relatively to the tubular connector and toward the left so as to cause said pressure ring to apply pressure to the discs.

4. In a clutch of the multiple disc type, the combination of a tubular connector extending through the clutch from the left end thereof to the right end thereof and adapted to surround and be detachably connected with a power transmitting shaft for rotation therewith which tubular connector has its left and right end portions held in fixed longitudinal relationship, abutment means secured to said tubular connector near the left end thereof, a series of interengaging friction discs surrounding the tubular connector with the disc at the left end of the series engaging the said abutment means, alternate discs of the series connected to the connector for rotation therewith and the intervening discs of the series being connectible with an annular power transmitting member surrounding the said connector, a pressure ring surrounding the shaft and rotatable therewith and engageable with the disc at the opposite end of the said series, a longitudinally movable sleeve surrounding the tubular connector and rotatable therewith, the said sleeve engaging at one end with said pressure ring and causing the ring to apply pressure to the discs upon movement of the sleeve toward the left, a rotatable armature ring rigidly connected with the longitudinally movable sleeve at a position near the right end thereof and longitudinally spaced from the pressure ring, a nonrotatable annular magnet surrounding the longitudinally movable sleeve between the rotatable pressure ring and the rotatable armature ring, means connected with said magnet and engaging said tubular connector at a position at the right of said rotatable armature ring which last said means serves to prevent longitudinal movement of said magnet and to thus enable said magnet when energized to move the armature ring and also the sleeve and the pressure ring relatively to the tubular connector and toward the left so as to cause said pressure ring to apply pressure to the discs, and separator rings between some of the friction discs which rings upon release of pressure serve to separate said discs and to move the pressure ring and the sleeve and the armature ring toward the right.

5. In a clutch of the multiple disc type, a removable and replaceable disc unit comprising a tubular connector member adapted to surround and to be detachably connected with a power transmitting shaft for rotation therewith and comprising abutment means on the left end portion of said connector member and also comprising a series of interengaging friction discs surrounding the said connector member with the disc at the left end of the series engaging the said abutment means which series has alternate discs connected to the connector member for rotation therewith and has the intervening discs connectible with an annular power transmitting member surrounding the said connector member, in combination with a second tubular connector member structurally separate from the first said connector member and adapted to surround and be connected with the said shaft adjacent the said first connector member, a pressure means surrounding the second connector member and rotatable therewith and longitudinally movable therealong which pressure means is engageable at its left end with the disc at the right end of the series, a rotatable armature ring rigidly connected with the longitudinally movable pressure means near the right end thereof, a nonrotatable annular magnet surrounding the longitudinally movable pressure means between the disc engaging end thereof and the rotatable armature ring and serving when energized to move the armature ring and also the said pressure means toward the left to cause the latter to apply pressure to the discs, and means connected with said magnet and engaging the last said connector member at a position at the right of said rotatable armature ring which last said means serves to prevent longitudinal movement of said magnet and to thus enable said magnet when energized to move the armature ring and the pressure means relatively to the tubular connector and toward the left so as to apply pressure to said discs.

References Cited in the file of this patent

UNITED STATES PATENTS

| | | |
|---|---|---|
| 681,847 | Faucett | Sept. 3, 1901 |
| 747,706 | Hewlett | Dec. 22, 1903 |
| 1,493,513 | Ziska | May 13, 1924 |
| 1,826,929 | Furnas | Oct. 13, 1931 |
| 2,217,357 | Coe | Oct. 8, 1940 |
| 2,375,783 | Gilfillan | May 15, 1945 |
| 2,547,137 | Ochtman | Apr. 3, 1951 |

FOREIGN PATENTS

| | | |
|---|---|---|
| 352,543 | France | June 5, 1905 |
| 398,434 | Great Britain | Sept. 14, 1933 |